US012126948B2

(12) United States Patent
Van Veen et al.

(10) Patent No.: US 12,126,948 B2
(45) Date of Patent: Oct. 22, 2024

(54) METHOD AND APPARATUS FOR EVALUATING TRANSMITTER PERFORMANCE CAPABILITIES IN A PASSIVE OPTICAL NETWORK

(71) Applicant: Nokia Solutions and Networks Oy, Espoo (FI)

(72) Inventors: Doutje Van Veen, New Providence, NJ (US); Amitkumar Mahadevan, Edison, NJ (US); Vincent Houtsma, New Providence, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 339 days.

(21) Appl. No.: 17/746,658

(22) Filed: May 17, 2022

(65) Prior Publication Data

US 2023/0379607 A1 Nov. 23, 2023

(51) Int. Cl.
*H04Q 11/00* (2006.01)
*H04B 10/073* (2013.01)
*H04B 10/2557* (2013.01)

(52) U.S. Cl.
CPC ..... *H04Q 11/0067* (2013.01); *H04B 10/0731* (2013.01); *H04B 10/2557* (2013.01); *H04Q 2011/0083* (2013.01)

(58) Field of Classification Search
None
See application file for complete search history.

(56) References Cited

U.S. PATENT DOCUMENTS

| 11,321,562 B2 | 5/2022 | Zheng et al. |
| 2010/0097087 A1* | 4/2010 | Hogeboom ...... G01R 31/31711 324/750.3 |
| 2012/0134665 A1* | 5/2012 | Lindsay ............ H04B 10/0799 398/16 |

(Continued)

OTHER PUBLICATIONS

Zang, Dechao et al.,"G.9804.3Amendment 1: Draft", Series G: Transmission Systems and Media, Digital Systems andNetworks, ITU-T, Apr. 2022, pp. 1-54 (Year: 2022).*

(Continued)

*Primary Examiner* — David W Lambert
(74) *Attorney, Agent, or Firm* — Captiol Patent & Trademark Law Firm, Pllc

(57) ABSTRACT

A method and apparatus is proposed for accurately evaluating the performance of optical transmitters under test conditions (such as high bit-rate modulation formats) that compromise the operability of standard test equipment used for this purpose. The proposed apparatus and method are similar to the elements associated with existing testing standards based on an optical eye diagram, with an important distinction that allows for accurate measurements of the transmitter's performance to be made. In particular, the sampling point for collecting eye diagram data samples in the inventive arrangement is shifted by half a period with respect to the conventional mid-eye sampling point, eliminating the need to include representative reference equalizer in the test equipment and providing an evaluation not influenced by the test equipment, resulting in a more accurate measurement of transmitter-related distortions.

19 Claims, 5 Drawing Sheets

(56) References Cited

U.S. PATENT DOCUMENTS

2015/0318919 A1* 11/2015 Dawe .................. H04L 1/20
398/16
2021/0042521 A1* 2/2021 Zheng ................ H04B 10/0799

OTHER PUBLICATIONS

Zhang, Dechao, et al., "G.9804.3 Amendment 1:Draft; TDxxx/WP1", Series G: Transmission Systems and Media, Digital Systems and Networks, Access Networks—Optical Line Systems for Local and Access Networks, "50-Gigabit-Capable Passive Optical Networks (50G-PON); Physical Media Dependent (PMD) Layer Specification Amendment 1", ITU-T Draft: Study Period 2021-2024; Study Group 15, Series TDXXX/WP1, International Telecommunication Union, vol. 2/15, Apr. 22, 2022, pp. 1-54.

Gutierrez-Castrejon, Ramon, et al., "Systematic Performance Comparison of (Duobinary)-PAM-2,4 Signaling under Light and Strong Opto-Electronic Bandwidth Conditions", Photonics, vol. 8, No. 13, Mar. 18, 2021 pp. 1-18.

Van Kerrebrouck, Joris, et al., "NRZ, Duobinary, or PAM4?: Choosing Among High-Speed Electrical Interconnects", IEEE Microwave Magazine IEEE Service Center, Piscataway, NJ; vol. 20, No. 7, Jun. 4, 2019, p. 24-35.

\* cited by examiner

METHOD AND APPARATUS FOR EVALUATING TRANSMITTER PERFORMANCE CAPABILITIES IN A PASSIVE OPTICAL NETWORK

TECHNICAL FIELD

Disclosed herein is a system and method for validating the performance capability of an optical transmitter for use within a passive optical network (PON).

BACKGROUND

Newly-proposed standards for supporting 50 Gb/s ("50G") per wavelength downstream transmission in a PON are based on non-return-to-zero (NRZ) detection with equalized bandwidth-limited optical components in the optical network unit (ONU) receivers. In order to validate OLT transmitters for satisfactory operation in this environment, a specific reference receiver is used to measure its performance in a manner prescribed by the standards. The reference receiver is configured to be representative of a typical bandwidth-limited receiver, which in an actual PON system may include a non-linear-based equalizer as well.

To date, the measurement typically utilized in the OLT transmitter validation process is the "Transmitter Dispersion and Eye Closure" (TDEC) measurement, as described in detail in ITU-T G.9804, entitled "50-*Gigabit-capable passive optical networks (50G-PON): Physical Media Dependent (PMD) layer specification*", incorporated herein by reference. Unfortunately, the standard TDEC measurement is only accurate for low to modest TDEC values and also requires linear inputs in order to provide accurate results; thus, the current maximum TDEC value of 5 dB as adopted in G.9804.3 (as well as the possible use of non-linear equalizers in practical PON receivers) raises concerns about using TDEC measurements to validate the capability of PON transmitters to support certain modulation rates (e.g., 50G NRZ).

Further, due to the large bandwidth limitation and inter-symbol-interference (ISI) associated with fiber dispersion at the 50G rate, the NRZ eye that is generated for use in the TDEC measurement is almost closed and needs to be opened up by using some type of equalization that will amplify certain parts of the frequency spectrum of the signal, but the equalization itself also results in increasing the level of noise enhancement in the received signal.

Thus, a measured TDEC value of an OLT transmitter for validation with 50G (or higher) NRZ modulation will be dominated by either the eye closure or the large noise introduced by the frequency response of the reference equalizer and the accuracy of the actual transmitter performance measurement (and therefore, the certainty of its validation) becomes problematic.

SUMMARY OF THE INVENTION

The needs remaining in the art are addressed by the present invention, which relates to a system and method for validating the operating characteristics of an optical transmitter as used within a passive optical network (PON). More particularly, the disclosure is directed to a method and apparatus for accurately evaluating the performance of optical transmitters under test conditions that compromise the operability of standard test equipment used for this purpose.

In accordance with the principles of the present invention, an apparatus and method are proposed that are similar to the existing TDEC standard, with an important distinction that allows for accurate measurements of the transmitter's performance to be made. In particular, the sampling point for collecting eye diagram data samples in the inventive arrangement is shifted by half a period with respect to the conventional mid-eye sampling point. The introduced time shift results in collecting samples from not only the outer "0" and "1" levels, but also from interior crossing points that create additional signal levels in the vertical direction of the eye diagram signal. It has been found that for selected advanced modulation formats and rates, the levels appearing at the bit period boundary levels (before applying any equalization, i.e., "as is") are more clearly pronounced and more open than the traditional mid-eye location used in performing the TDEC measurement. As a result, collecting sample data at this time-shifted location results in providing a measure of transmitter performance that is more accurate than possible from the middle of the period (i.e., the middle of the eye).

In one embodiment, the inventive method and apparatus are used to evaluate the performance of an optical transmitter operating at a 50G NRZ modulation rate. The standard test instrumentation used for transmitter performance evaluation creates an eye diagram with an extremely closed eye (without the application of any equalization techniques) that comprises the accuracy of a TDEC measurement for the 50G NRZ transmission. The time-shifted sampling point of the 50G NRZ signal coincides with a three-level signal location of the eye that can be analyzed using a process similar to that described in the ITU-T standard (modified to taken into consideration the use of six histograms for the three-level signal) and provide a more accurate predictor of transmitter's performance in a 50G PON system than the prior art method.

Indeed, the use of a time-shifted sampling point in this scenario obviates the need to include any type of equalizer, allowing for the data samples from the created eye diagram to be analyzed "as is". This is not to say that a somewhat clearer representation at the time-shifted location may be created by including an additional bandwidth limitation (for example), that makes the channel closer to an optimal duo-binary form. Thus, the inclusion of some level of equalization in combination with the inventive technique is thought to be a detail that may be left to a particular application.

The principles of the present invention may be embodied as a method of validating acceptable performance of an optical transmitter under test that includes the steps of: (1) defining a target symbol error rate ($SER_{target}$) and a maximum TDEC(T/2) value associated with acceptable performance of the optical transmitter; (2) operating the optical transmitter under test to deliver a 50G NRZ test signal to a test equipment apparatus emulating worst-case conditions at a reference receiver; (3) generating an optical eye diagram based on reception at the reference receiver; (4) defining a time-shifted sampling point $S_{T/2}$ at a position one-half bit period away from a center of the optical eye diagram; (5) performing a time-shifted TDEC (TDEC(T/2)) measurement at the time-shifted sampling point, based on the $SER_{target}$; and (6) validating acceptable performance of the optical transmitter if the measured TDEC(T/2) is less than the maximum TDEC(T/2) value. Another inventive method, for use with any defined test signal modulation rate, incorporates a conventional TDEC measurement and validates the performance of the optical transmitter as long as either the measured TDEC(T/2) or TDEC penalty levels are within acceptable limits.

An exemplary embodiment may take the form of an apparatus for validating performance of an optical transmitter, comprising a test instrument for emulating performance of a reference optical receiver and generating as an output an eye diagram representative of a recovered test signal, the eye diagram defined as spanning a bit period T, with an original sampling point S at the mid-point of the eye diagram; an optical channel exhibiting a worst-case dispersion value, the optical channel used to support the propagation of a test optical signal from the optical transmitter to the test instrument; and an analysis component coupled to the test instrument, the analysis component including at least one processor and at least one memory including computer program code, the at least one memory storing a target bit error rate value ($SER_{target}$), the at least one memory and the computer program code configured to, with the at least one processor, cause the analysis component to perform the method steps as outlined above.

Other and further aspects and embodiments of the present invention will become apparent during the course of the following discussion and by reference to the accompanying drawings.

BRIEF DESCRIPTION OF THE DRAWINGS

Referring now to the drawings.

DETAILED DESCRIPTION

An important aspect of provisioning a PON system is ensuring that the installed components are able to handle the defined levels of data traffic within the performance parameters as set by the industry standards. To that end, a "transmitter and dispersion eye closure" (TDEC) measurement has been defined by standards organizations and uses an optical eye diagram display (such as on an oscilloscope) to evaluate the performance of a transmitter under prescribed test conditions, providing a pass/fail evaluation of the transmitter-under-test before actually installing the component in a network. In general terms, the TDEC compares, for a defined target value of the bit error rate ($BER_{target}$), the noise $\sigma_{0,ideal}$ that can be added to an ideal signal (defined by the test signal's optical modulation amplitude (OMA)) to the noise $\sigma_G$ that can be added to the actual transmitted signal itself. The TDEC penalty can be expressed as follows:

$$TDEC = 10 \cdot \log_{10}\left(\frac{\sigma_{0,ideal}}{\sigma_G}\right).$$

Hypothetically, if the two noise values were the same, the TDEC penalty would be 0 dB and the transmitter being tested would obviously pass the performance test. Under actual testing conditions, if the maximum noise that can be applied to the actual transmitted signal is smaller, then there is a positive TDEC penalty. A threshold value of TDEC can be used as the pass/fail threshold for a transmitter being evaluated under a given set of operating conditions.

Figure 1:
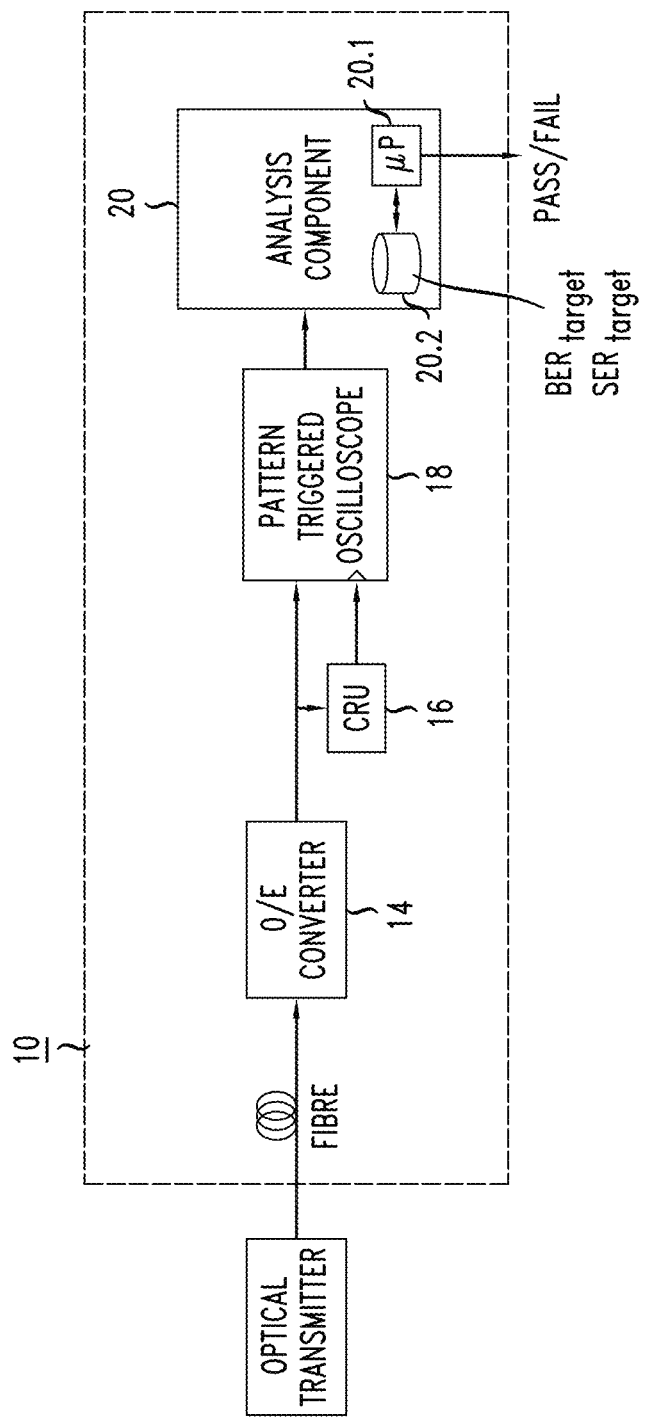
FIG. 1 illustrates an apparatus useful in performing three-level testing of 50G NRZ eye diagrams in accordance with the present invention.

FIG. 1 is a block diagram of an exemplary apparatus that may be used to perform the transmitter evaluation and, particularly, to perform TDEC conformance testing as part of the process of validating an OLT's transmitter for use in a PON system. Apparatus 10 includes a plurality of components that emulate the performance of a typical optical receiver operating under defined worst-case conditions, including the worst case acceptable transmission characteristics of the optical channel connecting the transmitter to the "typical receiver". In the particular arrangement of FIG. 1, apparatus 10 is shown as comprising a section of optical fiber 12 that is coupled to the transmitter under test and supports the propagation of a selected test signal into the reference receiver equipment. The length of optical fiber 12 is chosen to present a worst-case dispersion characteristic to the propagating test signal. The reference receiver test equipment includes an O/E converter 14 (which may comprise a PIN photodiode) that functions to convert the received optical test signal from the transmitter-under-test into an electrical equivalent. A clock recovery unit (CRU) 16 is responsive to the converted electrical signal and recovers the system clock from this electrical signal. Both the converted electrical signal and the recovered clock are shown in FIG. 1 as applied as inputs to a pattern-triggered oscilloscope 18 (or similar type of instrumentation). Oscilloscope 18 is configured to accumulate samples of the recovered data signal and display them as an optical eye diagram, as shown in FIG. 2.

Apparatus 10 further comprises an analysis component 20 that is coupled to oscilloscope 18 and used to analyze the data samples of the displayed eye diagram and calculate the various parameters used to determine the TDEC penalty associated with the transmitter being evaluated. Analysis component 20 includes a processor 20.1 and a memory 20.2 (which includes program code), the combination of processor 20.1 with memory 20.2 causing analysis component 20 to perform a TDEC measurement that is used to evaluate the performance of the OLT transmitter being tested. A defined $BER_{target}$, as well as a maximum allowable $TDEC_{max}$, may be stored within memory 20.2 and used by processor 20.1 in combination with collected histogram data to determine if the transmitter being evaluated either passes or fails the performance testing. It is to be understood that in many specific embodiments, analysis component 20 may be incorporated within the assembly of oscilloscope 18.

Figure 2:
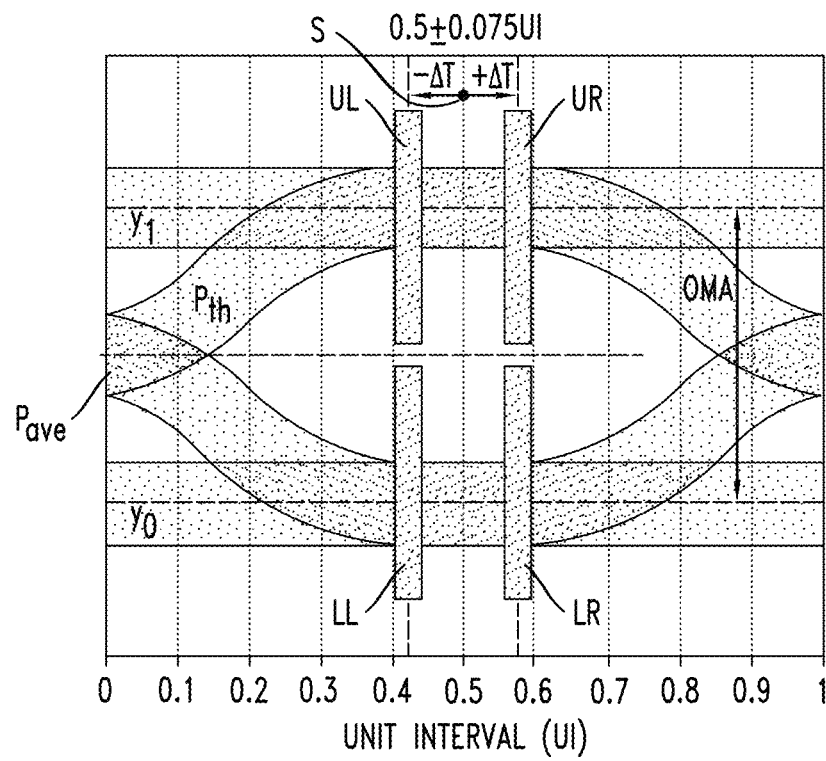
FIG. 2 is a prior art illustration of a typical eye diagram associated with a lower rate NRZ data transmission.

A sample optical eye diagram as created by oscilloscope 18 is shown in FIG. 2. Indicated on the diagram are the various data points used to perform a conventional TDEC measurement for a transmitter under evaluation. Shown in particular are the logic "0" ($Y_0$) and logic "1" ($Y_1$) levels (mean values) of the recovered data stream (used to calculate the OMA of the test signal). The average optical power ($P_{ave}$)/associated with the crossing points of the eye diagram, is also indicated in FIG. 2. The "eye" itself is typically evaluated in terms of its vertical opening O, where an ideal eye opening would span the complete vertical extent from the logic 0 level to the logic 1 level. However, the presence of noise in the received data stream is known to cause the eye to close, with the amount of closure may be used to evaluate the amount of noise within the system.

The illustrated bit period of the eye diagram in FIG. 2 is defined to span a single "unit interval" (UI), with the "0 UI" and "1 UI" time boundaries associated with the unit interval also shown in FIG. 2. For current explanatory purposes, the UI is defined as equivalent to a bit period "T". Also shown in FIG. 2 is a set of four vertical histograms that are defined in the ITU-T standard referenced above as the locations where data are collected and used to perform a TDEC measurement. The histograms are centered about a defined sampling point S, which as shown in FIG. 2 is the center of bit period T (also defined as 0.5 UI) with the histograms positioned at $\pm\Delta T$ from S. A first pair of histograms is shown at the $-\Delta T$ position (designated as "lower left" (LL) and "upper left" (UL)), and a second pair (designated similarly as LR and UR) are located at $+\Delta T$ from sampling point S. The upper and lower histograms are shown as positioned above and below $P_{ave}$, which provides a boundary for data collection. The histograms are defined to capture data points, distributed in the vertical direction, associated with the reception of a logic 0 or logic 1.

As described below, the TDEC is derived by comparing a maximum ideal noise level (based on the measured OMA) to an actual calculated maximum noise level (for a given $BER_{target}$). To proceed with the TDEC measurement, the distributions of the pair of histograms on one side of sample point S (for example, the left-hand pair) are each multiplied by Q functions, which represent an estimate of the probability of errors caused by each portion of the distribution for the greatest tolerable noise that could be added by an optical channel and a receiver. $Q(x)$ is defined as the area under the mathematically-defined Normal curve, for values larger than x (i.e., the "tail" probability, related to the "complementary error function"), which is defined as:

$$Q(x) = \int_x^\infty \frac{e^{(-z^2/2)}}{\sqrt{2\pi}} dz,$$

where x is either the quantity $(y-P_{ave})/\sigma_G$ (for the "lower" histogram) or $(P_{ave}-y)/\sigma_G$ (for the "upper" histogram) and $\sigma_G$ is a representative noise distribution ($\sigma_G$ being denoted as $\sigma_L$ calculations involving the left-hand histograms, and denoted as $\sigma_R$ for calculations involving the right-hand histograms). With this understanding of the use of the Q function, the TDEC methodology is used to find a value of $\sigma_G$ such that the following equation is satisfied for a defined value of $BER_{target}$:

$$\frac{1}{2}\left(\frac{\int f_u(y) Q\left(\frac{y-P_{ave}}{C_{eq} \cdot \sigma_G(y)}\right) dy}{\int f_u(y) dy}\right) + \frac{1}{2}\left(\frac{\int f_l(y) Q\left(\frac{P_{th}-y}{C_{eq} \cdot \sigma_G(y)}\right) dy}{\int f_l(y) dy}\right) = BER_{target}$$

where $f_u(y)$ and $f_l(y)$ are the upper and lower distributions of the samples collected within the respective histograms, and $C_{eq}$ is the noise enhancement factor associated with the reference equalizer that may be included within analysis component 20. If no reference equalizer is used, $C_{eq}=1$. The reference equalizer can be thought of as reducing the amount of noise $\sigma_G$ that can be added to the signal for the same $BER_{target}$. The ITU-T standard for 50G PON defines a $BER_{target}$ of $10^{-2}$.

Broadly speaking, the TDEC measurement can be thought of as a way to measure the amount of noise $\sigma_G$ present along both the "0" and "1" levels of a received NRZ data transmission, with each limit presumed to contribute half of the total noise. More specifically, the TDEC measurement compares the maximum amount of noise that can be added to an "ideal" signal (defined by the OMA of the received test signal) with the noise that can be added to the actual transmitted signal while maintaining the defined $BER_{target}$. To find the amount of noise $\sigma_{0,ideal}$ that may be added to an ideal signal, the Q function is performed on the ratio of the calculated OMA to the ideal noise for both the logic 0 and logic 1 levels, with the average of the pair of Q functions set to equal $BER_{target}$ in the following manner:

$$BER_{target} = \frac{1}{2} Q\left(\frac{OMA}{2\sigma_{0,ideal}}\right) + \frac{1}{2} Q\left(\frac{OMA}{2\sigma_{1,ideal}}\right).$$

While not a closed equation, a solution for the ideal noise $\sigma_{0,ideal}$ is obtained relatively quickly from this relation. Following this, a measured noise value for the actual test signal may be compared to the ideal to see how much margin remains before exceeding $BER_{target}$. TDEC is a measure of optical power penalty of the evaluated transmitter compared to an ideal transmitter, providing a value for the increase in optical power that would be required for the transmitter being evaluated to achieve the same eye opening as an ideal transmitter. Therefore, the lower the TDEC value, the better the performance of the transmitter being evaluated.

Figure 3:
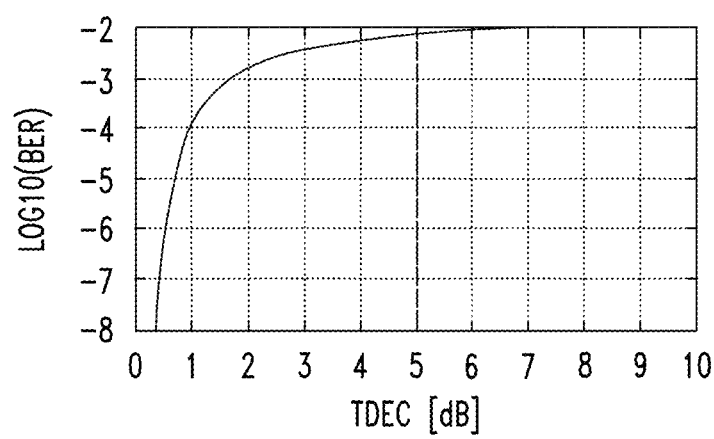
FIG. 3 is a plot illustrating the relationship between TDEC and BER.

While the use of the TDEC measurement as a predictor of transmitter performance as described above is suitable in theory, the recently-announced ITU-T G.9804 standard enabling the use of 50G NRZ (per wavelength) results in the standard test instrumentation introducing a level of eye closure that renders the conventional TDEC measurement an unreliable predictor of transmitter performance. FIG. 3 is a plot of BER versus TDEC for a 50G NRZ signal, as created by the standard test equipment, that illustrates the limitations of the conventional TDEC metric. As shown, once the actual BER is close to the target value ($BER_{target}$), the measured TDEC increases very rapidly for minimal changes in the actual BER. Thus, as $BER_{target}$ is approached, the TDEC becomes highly sensitive to small fluctuations and may not represent a good measure of the transmitter's actual performance capability. This is particularly relevant since the maximum TDEC of 5 dB specified in the G.9804 standard corresponds to a BER that is very close to $BER_{target}$.

More particularly, TDEC values associated with transmitters being evaluated for performance with 50G NRZ signals quickly become greater than 5 dB as the result of increases in noise factors within a standard receiver system. These include an increase in chromatic dispersion along the communication channel (e.g., optical fiber), as well as the increase in noise attributed to the reference receiver. The noise factors from these sources contribute to an increased level of inter-symbol interference (ISI) which is presented as a "closed" eye in the eye diagram. While the eye can be opened up by implementing a reference equalizer as mentioned above, this result in adding another source of noise to the received signal.

For the purposes of evaluating the performance of a transmitter for a specific application, the defined value for $TDEC_{max}$ may be different from that of the G.9804 standard maximum of 5 dB. Further, for at least the reasons discussed in association with the graph of FIG. 3, it may be preferred for the defined value of $TDEC_{max}$ to be less than the G.9804 standard maximum of 5 dB.

Figure 4:
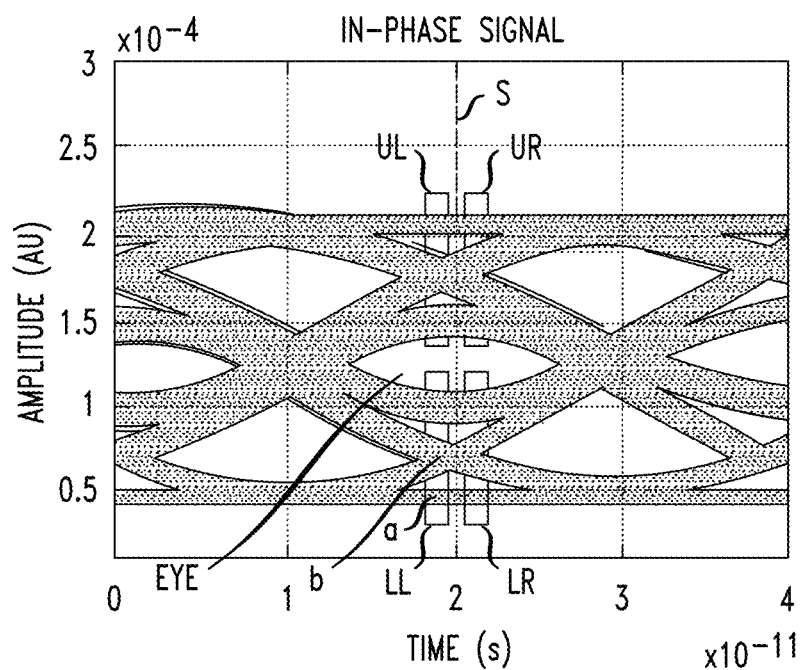
FIG. 4 is an eye diagram of an as-received transmission of 50G NRZ test data, when performing validation testing of an OLT transmitter for use in a PON system.

FIG. 4 is an eye diagram associated with an OLT transmitter being tested to operate with 50G NRZ data (as detected, no equalization performed), created using the conventional test equipment apparatus as shown in FIG. 1. In comparison to the standard (i.e., low modulation rate) example of FIG. 2, it is clear that the 50G NRZ eye of FIG. 4 is almost fully closed, which results in the histograms used to define the sample data sets for determining the TDEC value being spaced very closely together. In particular, FIG. 5 shows the histogram data associated with the left-hand pair of histograms LL and UL, with the understanding that the data associated with histograms LR and UR would be similar.

Figure 5:
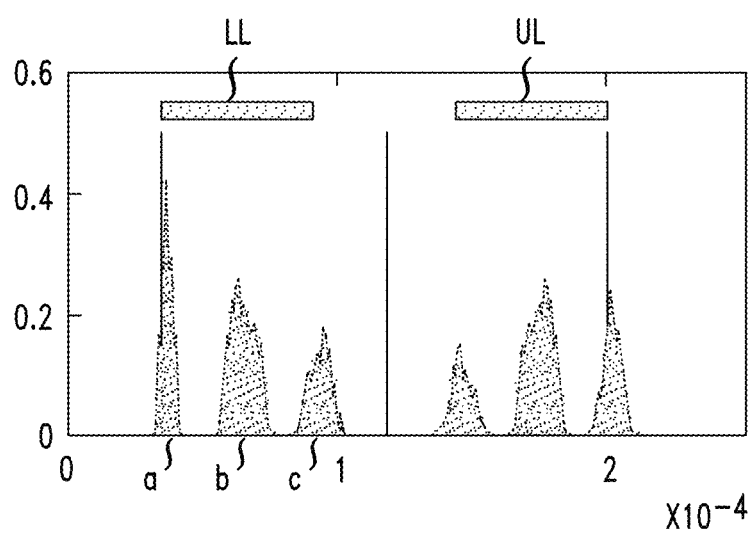
FIG. 5 shows one set of histograms depicting data samples collected from the eye diagram of FIG. 4 (e.g., left-hand histograms at the 0.4 UI location)

Histogram LL is shown in FIG. 5 as including three separate peaks (a, b, and c), with the data points spreading out from peaks in a manner that leaves little spacing between their groups. The spreading (mathematically, the standard deviation $\sigma$) is thus indicative of one problem in identifying a single value to associate with a logic 0 level for the transmitter being tested. Similarly, histogram UL includes a set of three peaks, with a large number of the data points spread outward in a manner that may introduce error in the TDEC measurement process. The large distribution of data with multiple peaks is considered to be at least one source of error that may lead to an inaccurate TDEC measurement. Again, this can be partly mitigated by using a reference equalizer at the receiver; however, this will add equalizer noise to the signal (and eye diagram) as well.

These problems are addressed and overcome by the apparatus and method of the present invention, which are based upon using a non-traditional, time-shifted sampling point within the eye diagram to access data that yields a more accurate measure of eye closure for selected high bit rate modulation formats (e.g., 50G NRZ) and, therefore, a better predictor of transmitter performance than the conventional TDEC measurement.

Figure 6:
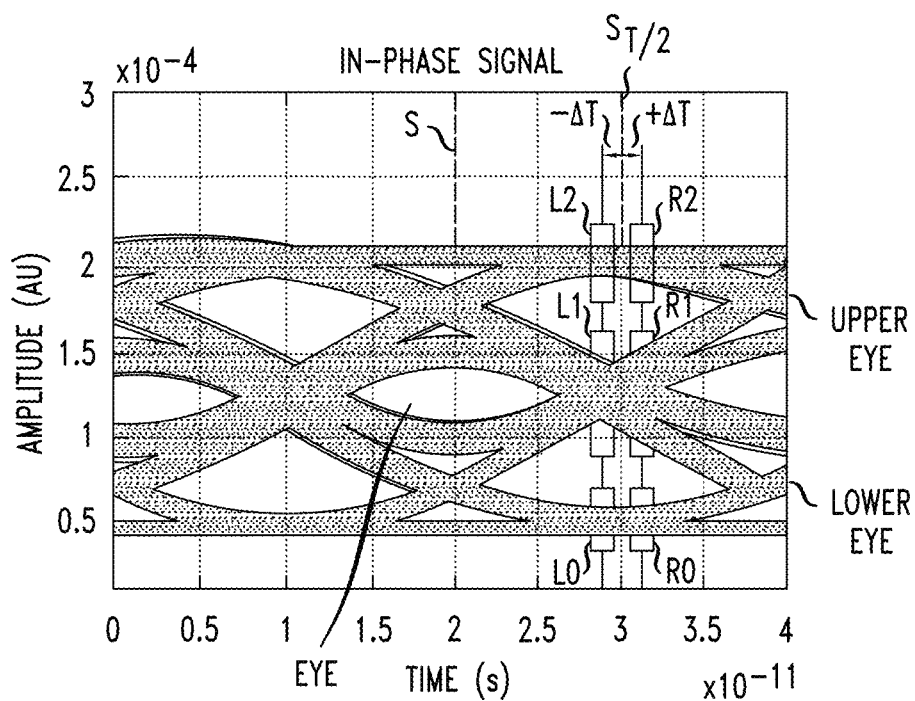
FIG. 6 illustrates the same eye diagram as that of FIG. 4, in this case identifying a time-shifted sampling point for use in collecting data samples at three separate levels within the eye diagram, providing an increase in accuracy than when using the prior art two-level procedure.

In particular, in order to overcome the noise problem associated with attempting to utilize the standard TDEC measurement with a 50G NRZ eye diagram, it is proposed to shift the sampling point by 0.5 UI (i.e., for a time period T, by an amount T/2), as illustrated in the eye diagram of FIG. 6. Indeed, FIG. 6 is a reproduction of the same 50G NRZ eye as shown in FIG. 4, but in this case identifying the time-shifted sampling point location ("$S_{T/2}$"). In this region, the diagram can be defined as comprising a "lower eye" LE and an "upper eye" UE, and the signal itself can be described as a "three-level" signal, formed of the two conventional levels (a "logic 0" lower level and a "logic 1" upper level) as defined above, as well as an intermediate level between the lower and upper eyes. Thus, as discussed below, sampling point $S_{T/2}$ is understood as associated with a "symbol" (three-level) location, as compared to the standard "bit" (two-level) location. For the sake of discussion, the three levels are identified as "L0", "L1", and "L2". Comparing sample point S of FIG. 4 to sample point $S_{T/2}$ of FIG. 6, it is quite evident that the portion of the 50G NRZ eye diagram at the time-shifted sampling location $S_{T/2}$ contains much less noise that the conventional mid-eye location S and as a result it may be presumed to provide an eye closure measurement with a significantly smaller degree of error than would otherwise be present in a conventional TDEC measurement performed at S (S=0.5 UI). Hereafter, the inventive method is referred to at times as a "TDEC(T/2)" measurement, noting that the measurement is time-shifted by the interval T/2 (in comparison to the prior art, conventional TDEC measurement).

Figure 7:
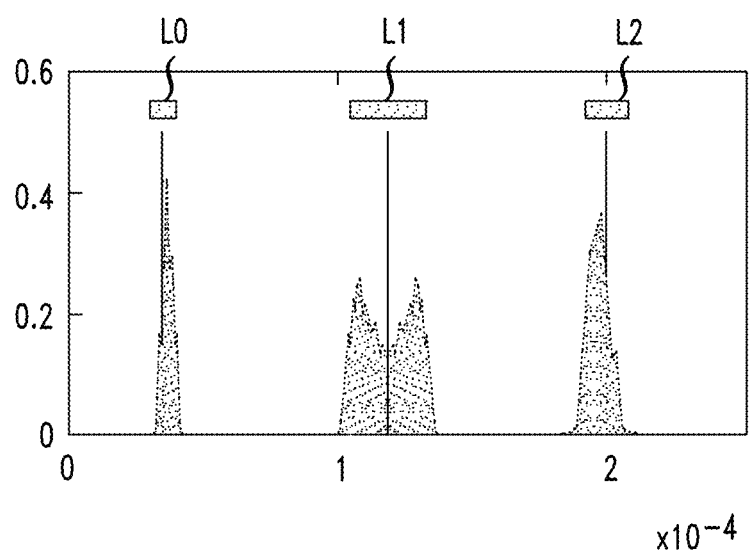
FIG. 7 shows one set of histograms including data sample points collected from a region near the time-shifted sampling point as shown in FIG. 6.

The TDEC(T/2) measurement process of the present invention will now be described in detail. In particular, data is collected at the three signal levels as shown in FIG. 6, with a defined $SER_{target}$ used to determine an ideal noise value (attributed to all three levels), followed by comparing a measured noise value to the ideal and use the comparison to calculate the TDEC(T/2) of the transmitter and make a determination of whether or not the transmitter qualifies for operation at 50G NRZ. In accordance with the use of a multi-level representation to evaluate performance using NRZ data, a "symbol error rate" (SER) is considered to more accurately represent the evaluation being performed at the time-shifted location. Thus, a target value used in analyzing the transmitter's performance is identified above and discussed below as "$SER_{target}$." Using the same $\pm\Delta T$ UI definitions for histogram locations, individual histograms are associated with the three signal levels at time-shifted sampling point $S_{T/2}$. A first set of three histograms, located at the $-\Delta T$ UI position, are identified as left-hand histograms L0, L1, L2. A second set of three histograms (identified as R0, R1, and R2) is located at the $+\Delta T$ UI position. FIG. 7 illustrates the sample points as included in the set of three left-hand histograms L0, L1, and L2 (with the presumption that the right-hand plots R0, R1, and R2 are essentially the same, the possibility of differences between the two sets discussed below). The described TDEC(T/2) measurement is performed "as is", meaning that there is no need for a representative reference equalizer to be incorporated in the receiver model (as used by analysis component 20) in performing a transmitter validation. As a result, the measurement is not influenced by equalizer noise and is considered to be more accurate in terms of measuring only transmitter-related distortions. That being said, a somewhat clearer representation at the time-shifted location may be created by including an additional bandwidth limitation (for example), that makes the channel closer to an optimal duo-binary form. Thus, the inclusion of some level of equalization in combination with the inventive technique is thought to be a detail that may be left to a particular application.

The improvement in accuracy of the inventive TDEC(T/2) methodology is evident by comparing the two sets of data as shown in FIGS. 5 and 7. Histogram L0 as shown in FIG. 7 is very compact, with little error/noise indicated as present, allowing for an accurate value of the lower level of the signal (i.e., "logic 0") to be identified. In contrast, the prior art histogram LL of FIG. 5 is spread across three peak values, with significant distributions of sample data between these peaks; identifying a representative "logic 0" for completing a TDEC measurement would be accompanied by an excessive margin for error that is unreasonable. Similar results would be found in comparing the time-shifted histogram L2 with the data samples forming the prior art UL histogram.

In order to properly calculate the noise measure for the inventive three-level case, the step of calculating the ideal noise as shown above and used in a conventional TDEC calculation is modified by adding an extra term for the third (intermediate) level L1. Since the middle level of the three-level signal occurs twice as often as the two outer levels (a result of ISI with respect to the limited bandwidth of the reference receiver), the resulting equation used to determine an ideal noise $\sigma_{0,ideal}$ is as follows:

$$SER_{target} = \frac{1}{4}Q\left(\frac{OMA}{4\sigma_{0,ideal}}\right) + \frac{1}{2}Q\left(\frac{OMA}{4\sigma_{1,ideal}}\right) + \frac{1}{4}Q\left(\frac{OMA}{4\sigma_{2,ideal}}\right)$$

with $\sigma_{0,ideal}$, $\sigma_{1,ideal}$, and $\sigma_{2,ideal}$ defined as the standard deviations (noise) of the three levels (L0, L1, and L2) around sampling point $S_{T/2}$ in the three-level portion of the eye diagram. It is to be understood that an appropriate value for $SER_{target}$ is determined a priori (perhaps by a third party standards organization) and "OMA" is defined in the same manner as above, that is, the amplitude spanning between an averaged signal at L0 and an averaged signal at L2 (typically derived from long sequences of 0's and 1's). Inasmuch as a defined value for $SER_{target}$ is related to an acceptable amount of noise at the boundaries of the duo-binary eye, its value is likely to be different from the standard $BER_{target}$ set by standards organizations.

The TDEC(T/2) method then finds a value of the test signal's maximum noise $\sigma_G$ such that the following equation is satisfied:

$$\frac{1}{4}\left(\frac{\int f_{upper}(y) Q\left(\frac{y - P_{u,th}}{C_{eq(T/2)}\sigma_G(y)}\right)dy}{\int f_{upper}(y)dy}\right) +$$

$$\frac{1}{4}\left(\frac{\int f_{middle}(y) Q\left(\frac{P_{u,th} - y}{C_{eq(T/2)}\sigma_G(y)}\right)dy}{\int f_{middle}(y)dy}\right) +$$

$$\frac{1}{4}\left(\frac{\int f_{middle}(y) Q\left(\frac{y - P_{l,th}}{C_{eq(T/2)}\sigma_G(y)}\right)dy}{\int f_{middle}(y)dy}\right) +$$

$$\frac{1}{4}\left(\frac{\int f_{lower}(y) Q\left(\frac{P_{l,th} - y}{C_{eq(T/2)}\sigma_G(y)}\right)dy}{\int f_{lower}(y)dy}\right) = SER_{target}$$

where $$P_{u,th} = \left(P_{ave} + \frac{OMA}{4}\right)$$

is the decision threshold for the upper eye, and $$P_{l,th} = \left(P_{ave} - \frac{OMA}{4}\right)$$

is the decision threshold for the lower eye; $P_0$ and $P_1$ being the mean levels of the logic "0" and logic "1" levels of the recovered data stream, such that OMA is defined as $P_1 - P_0$.

Presuming that the elements "$f_{upper}$", "$f_{middle}$", and "$f_{lower}$" are associated with the set of three left-hand histograms, the noise value $\sigma_G$ is defined as $\sigma_L$. The term $C_{eq(T/2)}$ is associated with the equalization that may be performed at the time-shifted sampling point to improve the clarity of the eye openings at this location. As discussed above, most implementations may prefer to utilize the received data samples "as is" and thus not perform any equalization. In this case, $C_{eq(T/2)}=1$. Alternatively, in situations where perhaps an addition degree of precision is required for the transmitter performance evaluation, some minimal amount of equalization may be introduced. In these situations, $C_{eq(T/2)}$ is set to be different from one (i.e., either less than one, or greater than one).

The above calculation is then performed for the data samples within the right-hand histograms, where the elements "$f_{upper}$", "$f_{middle}$", and "$f_{lower}$" are associated with the set of three right-hand histograms, providing a noise value of R. For the purposes of evaluating the performance of the transmitter under test (which can be defined as a "device under test" (DUT)), a noise level $\sigma_{DUT}$ is defined as min ($\sigma_L$, $\sigma_R$).

Following this determination of $\sigma_{DUT}$, the TDEC(T/2) measurement can be expressed as follows:

$$TDEC(T/2) = 10 \cdot \log_{10}\left(\frac{\sigma_{0,ideal}}{\sigma_{DUT}}\right).$$

A maximum value for TDEC(T/2) may also be defined a priori (i.e., similar to the TDEC standard of 5 dB), where the actual measured value for a transmitter under test compared to the maximum value and a pass/fail decision made on the transmitter accordingly. In particular, a defined value for $TDEC(T/2)_{max}$ may intentionally be set to be somewhat less than level set by an industry standard in order to avoid increased sensitivity in obtaining proper TDEC(T/2) measurements that may arise in the presence of small fluctuations in SER when approaching an industry-set maximum value for TDEC(T/2).

Extrapolating from this result, it has been further determined that using the time-shifted sampling location will yield a more accurate prediction of transmitter performance in those modulation formats where the inter-level openings at the eye boundary are clearer than the conventional measurement of openings at the mid-point of the eye diagram. For example, an eye diagram associated with 7-level polybinary signal opens up at the time-shifted T/2 location in a manner similar to that described in detail above (using sets of seven histograms on each side of the sampling point, instead of three). For this polybinary example, the $SER_{target}$ would include properly weighted contributions from each of the seven distinct levels and be defined as follows:

$$SER_{target} = \frac{1}{64}Q\left(\frac{OMA}{12\sigma_{0,ideal}}\right) + \frac{6}{64}Q\left(\frac{OMA}{12\sigma_{1,ideal}}\right) + \frac{15}{64}Q\left(\frac{OMA}{12\sigma_{2,ideal}}\right) +$$

$$\frac{20}{64}Q\left(\frac{OMA}{12\sigma_{3,ideal}}\right) + \frac{15}{64}Q\left(\frac{OMA}{12\sigma_{4,ideal}}\right) + \frac{6}{64}Q\left(\frac{OMA}{12\sigma_{5,ideal}}\right) + \frac{1}{64}Q\left(\frac{OMA}{12\sigma_{6,ideal}}\right).$$

The associated TDEC(T/2) measurement performed with respect to this $SER_{target}$ values, using the methodology outlined above. While the use of the time-shifted sampling point (T/2) is preferred for a 7-level polybinary signal, the original sample point T provides a more accurate result for a 5-level polybinary signal (as well as PAM4).

Therefore, an aspect of the inventive principles as described above is that a method of evaluating the performance of a transmitter under test and providing an accurate recommendation for its use in a PON system may use a combination of both a TDEC measurement and TDEC(T/2) measurement. That is, a priori, it may not be immediately obvious which sampling point will yield the best result, so a method that progresses through measurements at both locations is considered to provide a more complete analysis of a transmitter's performance. Performing measurements at both sampling points T and T/2, and comparing the results against agreed-upon target values, is thought to provide a higher level of confidence in the evaluation results.

Figure 8:
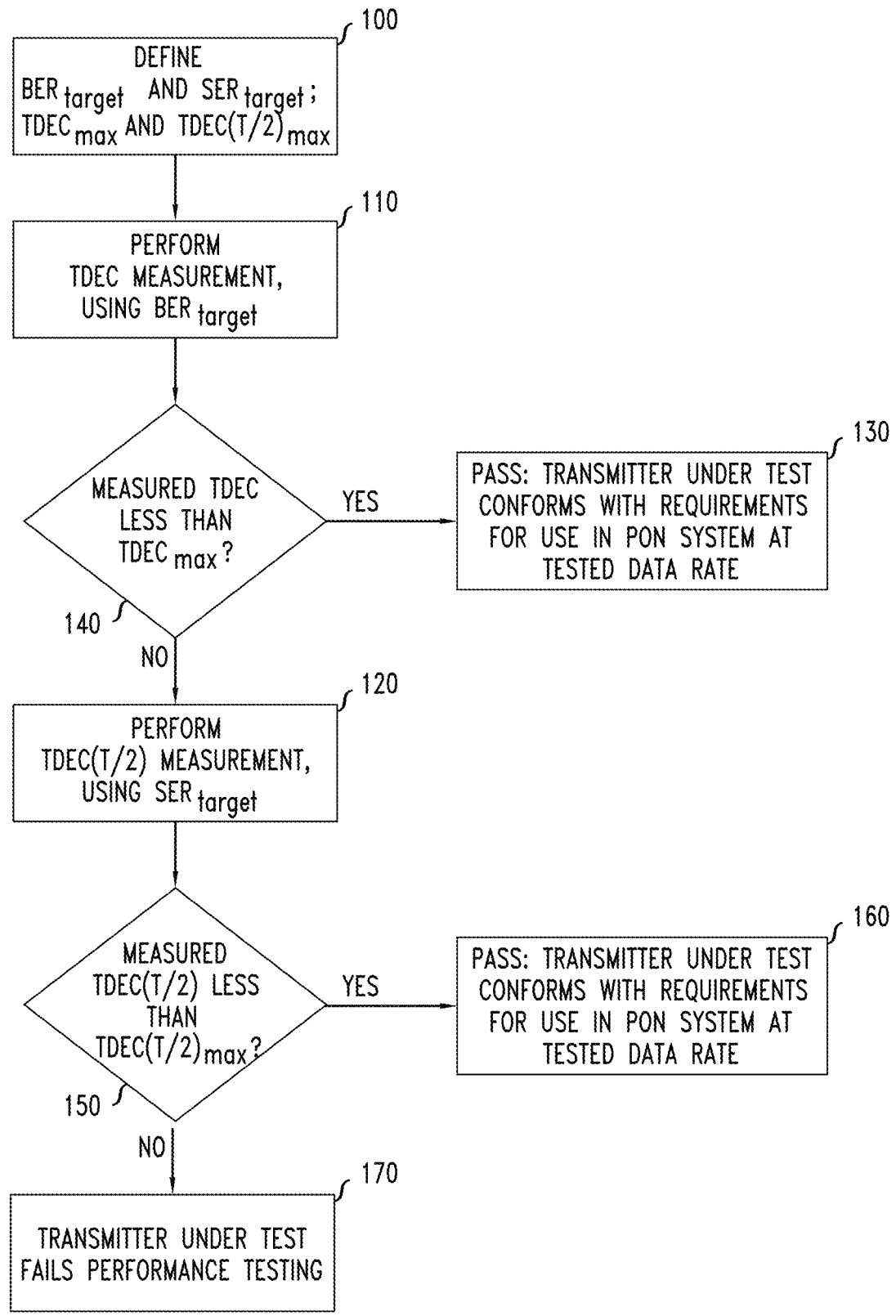
FIG. 8 is a flowchart outline steps that may be employed in a method of evaluating and predicting acceptable transmitter perform in a PON system.

FIG. 8 is a high-level flowchart illustrating this methodology. Step 100 is shown as beginning with having the target values for both BER and SER identified prior to beginning any testing. While strictly speaking the "BER" defines an error rate associated with a two-level "bit", and other in-level signals sampled at this standard mid-point location are truly related to a "symbol", the nomenclature "BER" will be maintained for mid-point sampling for the sake of discussion as to distinguish from the SER value associated with sampling at (T/2). It will also be presumed that both $BER_{target}$ and $SER_{target}$ will be readily available from industry standards associated with PON systems) Similarly, maximum acceptable values for TDEC and TDEC(T/2) are defined (shown as $TDEC_{max}$ and $TDEC(T/2)_{max}$) and for the reasons discussed above the maximum values used for assessing a transmitter's performance may be chosen to be somewhat less than any industry standard defined maximum value. Following, step 110 instructs the performance of a TDEC measurement for a specific PON transmitter under test, providing a measure of maximum noise margin for that transmitter associated with $BER_{target}$. In step 120, the measured TDEC is compared to the stored $TDEC_{max}$, and if less than this maximum penalty level, the transmitter can be identified as complying the requirements for use in the PON system (step 130); that is, having an acceptable noise margin to operate satisfactorily in a PON system using the defined test modulation rate.

If the result of the comparison in step 120 is not satisfactory, then the process continues by time-shifting the sampling point and performing a TDEC(T/2) measurement based on $SER_{target}$ (shown as step 140 and as described in detail above). The TDEC(T/2) penalty is then compared to $TDEC(T/2)_{max}$ (step 150). Again, if the measured time-shifted penalty is less than the maximum value, the transmitter is identified as complying with the requirements of the PON system (step 160). Otherwise, the transmitter is considered as failing the performance evaluation testing (step 170).

While the above is considered to be a full description of the specific embodiments, various modifications, alternative constructions and equivalents may be used. Therefore, the above description and illustrations should not be taken as limiting the scope of the present invention, which is embodied in the following claims.

What is claimed is:

1. A method of validating acceptable performance of an optical transmitter under test, comprising:
   defining a target bit error rate ($BER_{target}$), a target symbol error rate ($SER_{target}$), a maximum TDEC value ($TDEC_{max}$) and a maximum TDEC(T/2) value ($TDEC(T/2)_{max}$) associated with acceptable performance of the optical transmitter;
   operating the optical transmitter under test to deliver an optical test signal at a defined modulation rate to a test equipment apparatus emulating worst-case conditions at a reference receiver;
   generating an optical eye diagram based on reception at the reference receiver;
   performing a transmitter dispersion and eye closure (TDEC) measurement, based on the $BER_{target}$, at a sampling point T at a mid-point of the optical eye diagram;
   defining a time-shifted sampling point $S_{T/2}$ at a position one-half bit period away from the mid-point of the optical eye diagram;
   performing a time-shifted TDEC (TDEC(T/2)) measurement, based on the $SER_{target}$, at the time-shifted sampling point;
   validating acceptable performance of the optical transmitter if the measured TDEC is less than $TDEC_{max}$ or if the measured TDEC(T/2) is less than $TDEC(T/2)_{max}$.

2. The method as defined in claim 1, wherein the optical transmitter under test transmits a 50G NRZ test signal, and the defined time-shifted sampling point $S_{T/2}$ comprises a three-level signal.

3. The method as defined in claim 2, wherein the step of performing a TDEC(T/2) measurement includes
   a) creating a first set of three histograms at a first location $-\Delta T$ from $S_{T/2}$, associated with the three-level signal;
   b) using a Q function, generating probability distributions of each histogram; and
   c) determining a first test signal noise component $\sigma_L$ that includes ¼ contributions from lower and upper levels of the three-level signal and a ½ contribution from a middle level of the three-level signal.

4. The method as defined in claim 3 wherein step c) includes solving for $\sigma_L$ by using the relation $$\frac{1}{4}\left(\frac{\int f_{upper}(y)Q\left(\frac{y-P_{u,th}}{C_{eq(T/2)}\sigma_G(y)}\right)dy}{\int f_{upper}(y)dy}\right)+$$

$$\frac{1}{4}\left(\frac{\int f_{middle}(y)Q\left(\frac{P_{u,th}-y}{C_{eq(T/2)}\sigma_G(y)}\right)dy}{\int f_{middle}(y)dy}\right)+$$

$$\frac{1}{4}\left(\frac{\int f_{middle}(y)Q\left(\frac{y-P_{l,th}}{C_{eq(T/2)}\sigma_G(y)}\right)dy}{\int f_{middle}(y)dy}\right)+$$

$$\frac{1}{4}\left(\frac{\int f_{lower}(y)Q\left(\frac{P_{l,th}-y}{C_{eq(T/2)}\sigma_G(y)}\right)dy}{\int f_{lower}(y)dy}\right) = SER_{target}$$

where $$P_{u,th} = \left(P_{ave} + \frac{OMA}{4}\right), P_{l,th} = \left(P_{ave} - \frac{OMA}{4}\right),$$

$C_{eq(T/2)}$ is a selected noise enhancement factor associated with performed equalization on the recovered data stream and OMA=$P_1$–$P_0$, where $P_0$ and $P_1$ are defined as the mean levels of the logic "0" and logic "1" levels of the recovered data stream, with $\sigma_G(y)=\sigma_L$.

5. The method as defined in claim 4 wherein no equalization is performed on the recovered data stream, providing $C_{eq(T/2)}=1$.

6. The method as defined in claim 4 wherein equalization is performed on the recovered data stream to provide a value for $C_{eq(T/2)}$ which is less than 1.

7. The method as defined in claim 4 wherein equalization is performed on the recovered data stream to provide a value for $C_{eq(T/2)}$ which is greater than 1.

8. The method as defined in claim 3, wherein steps a)-c) are repeated at a second location $+\Delta T$ from $S_{T/2}$, determining a second test signal noise component $\sigma_R$, and including the additional steps of:

selecting the lesser of $\sigma_L$ and $\sigma_R$ as the minimum test signal noise level standard deviation $\sigma_{DUT}$.

9. The method as defined in claim 8 wherein step c) includes solving for $\sigma_R$ by using the relation $$\frac{1}{4}\left(\frac{\int f_{upper}(y)Q\left(\frac{y-P_{u,th}}{C_{eq(T/2)}\sigma_G(y)}\right)dy}{\int f_{upper}(y)dy}\right)+$$

$$\frac{1}{4}\left(\frac{\int f_{middle}(y)Q\left(\frac{P_{u,th}-y}{C_{eq(T/2)}\sigma_G(y)}\right)dy}{\int f_{middle}(y)dy}\right)+$$

$$\frac{1}{4}\left(\frac{\int f_{middle}(y)Q\left(\frac{y-P_{l,th}}{C_{eq(T/2)}\sigma_G(y)}\right)dy}{\int f_{middle}(y)dy}\right)+$$

$$\frac{1}{4}\left(\frac{\int f_{lower}(y)Q\left(\frac{P_{l,th}-y}{C_{eq(T/2)}\sigma_G(y)}\right)dy}{\int f_{lower}(y)dy}\right)=SER_{target}$$

where $$P_{u,th}=\left(P_{avev}+\frac{OMA}{4}\right), P_{l,th}=\left(P_{ave}-\frac{OMA}{4}\right),$$

$C_{eq(T/2)}$ is a selected noise enhancement factor associated with performed equalization on the recovered data stream and OMA=$P_1$–$P_0$, where $P_0$ and $P_1$ are defined as the mean levels of the logic "0" and logic "1" levels of the recovered data stream, with $\sigma_G(y)=\sigma_R$.

10. A method of validating acceptable performance of an optical transmitter during transmission of a test signal operating a defined modulation rate, comprising:

defining a target symbol error rate ($SER_{target}$) and a maximum TDEC(T/2) value ($TDEC(T/2)_{max}$) associated with acceptable performance of the optical transmitter;

operating the optical transmitter under test to deliver the test signal to a test equipment apparatus emulating worst-case conditions at a reference receiver;

generating an optical eye diagram based on reception at the reference receiver;

defining a time-shifted sampling point $S_{T/2}$ at a position one-half bit period away from a center of the optical eye diagram;

performing a time-shifted TDEC (TDEC(T/2)) measurement at the time-shifted sampling point, based on the $SER_{target}$;

validating acceptable performance of the optical transmitter if the measured TDEC(T/2) is less than TDEC$(T/2)_{max}$.

11. The method as defined in claim 10 wherein the defined modulation rate is 50 Gb/s NRZ and the time-shifted sampling point $S_{T/2}$ is associated with a three-level signal location.

12. The method as defined in claim 10 wherein the step of performing a TDEC(T/2) measurement includes creating a first set of three histograms at a point $-\Delta T$ from the time-shifted sampling point $S_{T/2}$ and a second set of three histograms at a point $+\Delta T$ from the time-shifted sampling point $S_{T/2}$.

13. Apparatus for validating performance of an optical transmitter for use in a PON system, comprising:

a test instrument for emulating performance of a reference optical receiver and generating as an output an eye diagram representative of a recovered test signal, the eye diagram defined as spanning a bit period T, with an original sampling point S at a mid-point of the eye diagram;

an optical channel exhibiting a worst-case dispersion value, the optical channel used to support the propagation of a test optical signal from the optical transmitter to the test instrument; and an analysis component coupled to the test instrument, the analysis component including at least one processor and at least one memory including computer program code, the at least one memory storing a target bit error rate value ($BER_{target}$), a target symbol error rate ($SER_{target}$), a maximum TDEC value ($TDEC_{max}$) and a maximum TDEC(T/2) value ($TDEC(T/2)_{max}$), the at least one memory and the computer program code configured to, with the at least one processor, cause the analysis component to:

perform a transmitter dispersion and eye closure (TDEC) measurement at a sampling point T at a mid-point of the optical eye diagram, based on the $BER_{target}$;

define a time-shifted sampling point $S_{T/2}$ at a position one-half bit period away from the mid-point of the optical eye diagram;

perform a time-shifted TDEC (TDEC(T/2)) measurement at the time-shifted sampling point, based on the $SER_{target}$; and validating acceptable performance of the optical transmitter if the measured TDEC is less than $TDEC_{max}$ or if the measured TDEC(T/2) is less than $TDEC(T/2)_{max}$.

14. The apparatus of claim 13, wherein the analysis component is configured to include at least one reference equalizer for reducing an amount of noise capable of being added to the transmitted test signal.

15. The apparatus of claim 14, wherein the at least one reference equalizer comprises a first reference equalizer for modifying the test signal prior to performing a TDEC measurement and a second, different reference equalizer for modifying the test signal prior to performing a TDEC(T/2) measurement.

16. The apparatus as defined in claim 13 wherein the optical channel comprises an optical fiber of a length L defined to provide a worst-case dispersion of the transmitted test signal between the transmitter under test and the test equipment.

17. The apparatus as defined in claim 13 wherein the optical transmitter under test comprises an optical line terminal (OLT) transmitter for use in a passive optical network (PON), the apparatus used to validate the satisfactory operation of the optical transmitter prior to deployment in the PON.

18. The apparatus as defined in claim 17 wherein the OLT transmitter is tested to validate satisfactory operation with a 50 Gb/s (50G) NRZ test signal.

19. The apparatus as defined in claim 13 wherein the optical transmitter under test comprises an optical network unit (ONU) transmitter for use in a PON, the apparatus used to validate the satisfactory operation of the optical transmitter prior to deployment in the PON.

* * * * *